US011024091B2

(12) United States Patent
Singh

(10) Patent No.: US 11,024,091 B2
(45) Date of Patent: Jun. 1, 2021

(54) SYSTEM AND METHOD FOR PLACEMENT OF AUGMENTED REALITY INFORMATION FOR USERS BASED ON THEIR ACTIVITY

(71) Applicant: PCMS Holdings, Inc., Wilmington, DE (US)

(72) Inventor: Mona Singh, Cary, NC (US)

(73) Assignee: PCMS Holdings, Inc., Wilmington, DE (US)

(*) Notice: Subject to any disclaimer, the term of this patent is extended or adjusted under 35 U.S.C. 154(b) by 0 days.

(21) Appl. No.: 16/466,600

(22) PCT Filed: Dec. 14, 2017

(86) PCT No.: PCT/US2017/066499
§ 371 (c)(1),
(2) Date: Jun. 4, 2019

(87) PCT Pub. No.: WO2018/118661
PCT Pub. Date: Jun. 28, 2018

(65) Prior Publication Data
US 2020/0074740 A1 Mar. 5, 2020

Related U.S. Application Data

(60) Provisional application No. 62/437,455, filed on Dec. 21, 2016.

(51) Int. Cl.
G06T 19/00 (2011.01)
G06F 3/01 (2006.01)
(Continued)

(52) U.S. Cl.
CPC ............ *G06T 19/006* (2013.01); *G06F 3/012* (2013.01); *G06K 9/00671* (2013.01);
(Continued)

(58) Field of Classification Search
None
See application file for complete search history.

(56) References Cited

U.S. PATENT DOCUMENTS

2014/0267400 A1  9/2014  Mabbutt
2015/0156803 A1  6/2015  Ballard
(Continued)

FOREIGN PATENT DOCUMENTS

EP   3073352 A2    9/2016
WO   2015185110 A1  12/2015

OTHER PUBLICATIONS

International Search Report and Written Opinion of the International Searching Authority for PCT/US2017/066499 dated Mar. 13, 2018.

(Continued)

Primary Examiner — Frank S Chen
(74) Attorney, Agent, or Firm — Invention Mine LLC

(57) ABSTRACT

Systems and methods described herein are provided for receiving location information for a real-world object in a user's augmented reality (AR) view, determining a direction of travel of a user, determining an activity zone shape associated with the direction of travel, responsive to a determination that the real-world object is within the activity zone, rendering on an AR display AR information associated with the real-world object at a location outside an area of the AR display used to display the activity zone. Some embodiments continue to display AR information in the same location if the user changes his or her gaze to read the AR information. Some embodiments render on an AR display subtle highlighting if an object is inside an activity zone and prominent highlighting if an object is outside an activity zone.

20 Claims, 15 Drawing Sheets

(51) Int. Cl.
*G06K 9/00* (2006.01)
*G06T 19/20* (2011.01)

(52) U.S. Cl.
CPC .......... *G06T 19/003* (2013.01); *G06T 19/20* (2013.01); *G06T 2219/2004* (2013.01)

(56) References Cited

U.S. PATENT DOCUMENTS

| | | |
|---|---|---|
| 2015/0277113 A1 | 10/2015 | Border |
| 2016/0054795 A1* | 2/2016 | Sasaki ............... G06F 3/011 345/642 |
| 2016/0093105 A1 | 3/2016 | Rimon |
| 2016/0284126 A1* | 9/2016 | Leppanen ............ G06T 7/20 |
| 2017/0109916 A1* | 4/2017 | Kurz .................. H04N 7/183 |

OTHER PUBLICATIONS

Written Opinion of the International Preliminary Examining Authority for PCT/US2017/066499 dated Sep. 11, 2018.
International Preliminary Report on Patentability for PCT/US2017/066499 completed Mar. 11, 2019, 17 pages.
Paller, G. "Motion Recognition with Android Devices". Sfonge LTD., available at: http://www.slideshare.net/paller/motion-recognition-with-android-devices, Oct. 7, 2011, 47 pages.
Android Developer, "Motion Sensors". Web Archive dated Nov. 6, 2016, available at: http://web.archive.org/web/20161106205337/https://developer.android.com/guide/topics/sensors/sensors_motion.html, 11 pages.
Weisstein, W. "Cone". MathWorld—A Wolfram Web Resource, available at: http://mathworld.wolfram.com/Cone.html, (1999), 5 pages.
Chen, G., "How to Convert 3-Axis Directions and Swap X—Y Axis of Accelerometer Data within Android™ Driver". Freescale Semiconductor, Inc. Doc. No. AN4317, available at: http://cache.freescale.com/files/sensors/doc/app_note/AN4317.pdf, Aug. 2011, pp. 1-10.

* cited by examiner

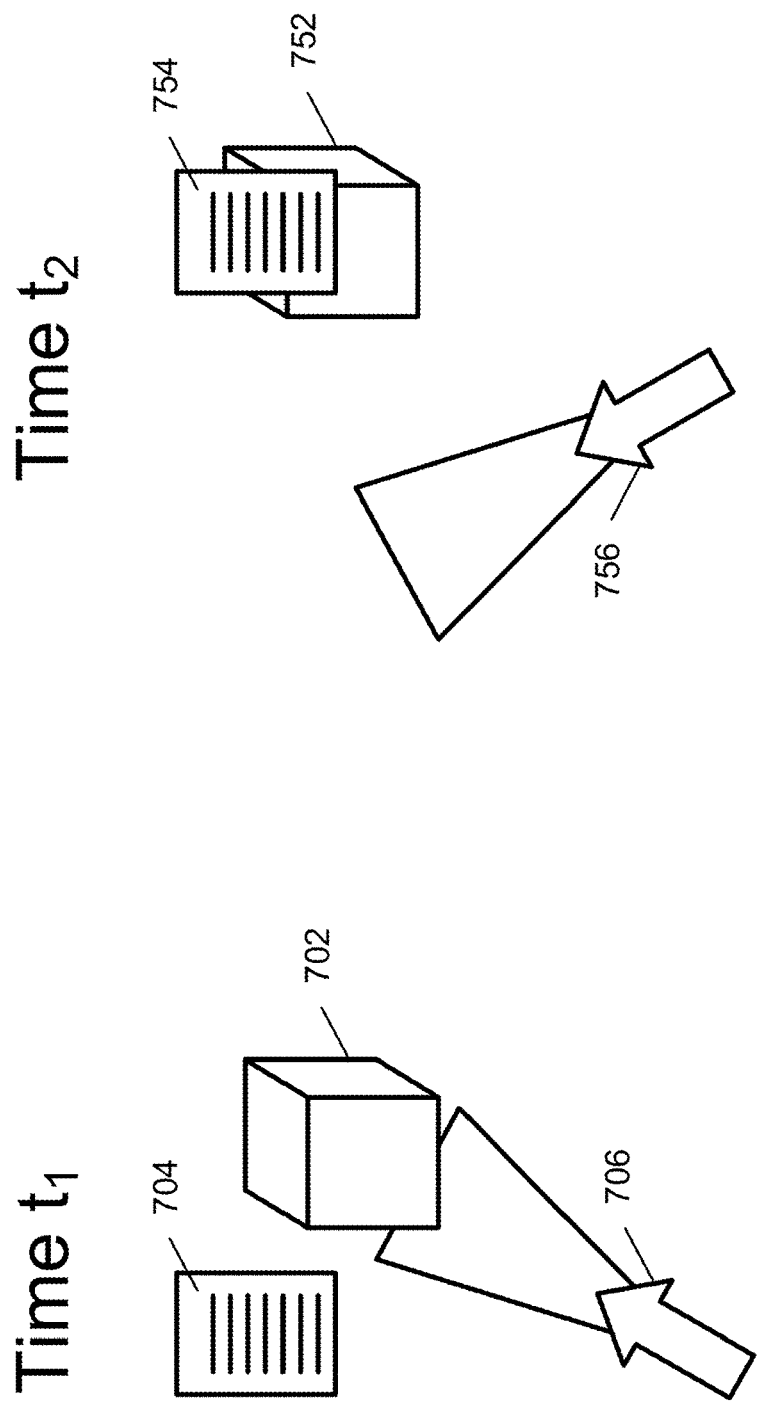

SYSTEM AND METHOD FOR PLACEMENT OF AUGMENTED REALITY INFORMATION FOR USERS BASED ON THEIR ACTIVITY

CROSS-REFERENCE TO RELATED APPLICATIONS

The present application is a national stage application under 35 U.S.C. 371 of International Application No. PCT/US2017/66499, entitled SYSTEM AND METHOD FOR PLACEMENT OF AUGMENTED REALITY INFORMATION FOR USERS BASED ON THEIR ACTIVITY, filed on Dec. 14, 2017, which claims benefit under 35 U.S.C. § 119(e) from U.S. Provisional Patent Application Ser. No. 62/437,455, entitled "System and Method for Placement of Augmented Reality Information for Users Based on Their Activity," filed Dec. 21, 2016, the entirety of which is incorporated herein by reference.

BACKGROUND

When a user is walking around with augmented reality (AR) glasses, applications may display annotations and/or animations overlaid on top of a real-world view and block or obscure a users ability to see both the real world and the augmentations.

Different techniques have been considered for determining which AR annotations should be displayed to a user. One such technique is to display AR information about real-world (or real-life) objects that are in the user's field of view, including objects that may be too far away to be discerned by the user. Another such technique is to display AR information about real-world objects on which the users gaze rests. The first technique may overwhelm the user with AR information, especially in environments where there are many real-world objects in the users field of view for which information is available to be displayed to the user. The second technique may display AR information about fewer real-world objects than the first system, though the second technique displays AR information for any real-world object upon which the user may happen to gaze. The AR information for these objects may interfere with the very scene that the user is viewing.

SUMMARY

Systems and methods described herein relate to user interfaces that display relevant augmented reality (AR) information in a manner that is unobtrusive to the user and does not interfere with the user's main activity. For example, AR information may be restaurant or coffee icons or directions to such locations. For some embodiments, such AR information may be displayed on an optical see-through device as overlay graphics that highlight a real-world object, such as a sign or a building, associated with a restaurant or store. For some embodiments, AR information (such as locations and distances to local coffee shops) may be retrieved from an external server and displayed to a user on an AR display, such as an AR optical see-through device.

A users main activity may correspond to part of the user's visual field (e.g., the center region of where the user may be looking and moving). Systems and methods described herein display augmented information outside an activity zone so the information does not interfere with the users activity. The user may turn his or her gaze without causing changes in the placement of the augmented information. Thus, the user may view and interact with augmented information without the information intruding into the user's main activity. A device or system application may display AR information and objects in a manner that does not obscure an active activity zone.

Systems and methods herein provide dynamic determinations of how and when AR information about real-world objects may be displayed to a user. Some embodiments determine how such information may be displayed to a user whose direction of gaze and direction of motion may be approximately, but imperfectly, aligned without interfering with the user's interaction with reality.

BRIEF DESCRIPTION OF THE DRAWINGS

A more detailed understanding may be had from the following description, presented by way of example in conjunction with the accompanying drawings.

FIGS. 7A and 7B are perspective view schematic diagrams for the placement of AR information at two moments in time when a user changes direction of motion.

Figure 1:
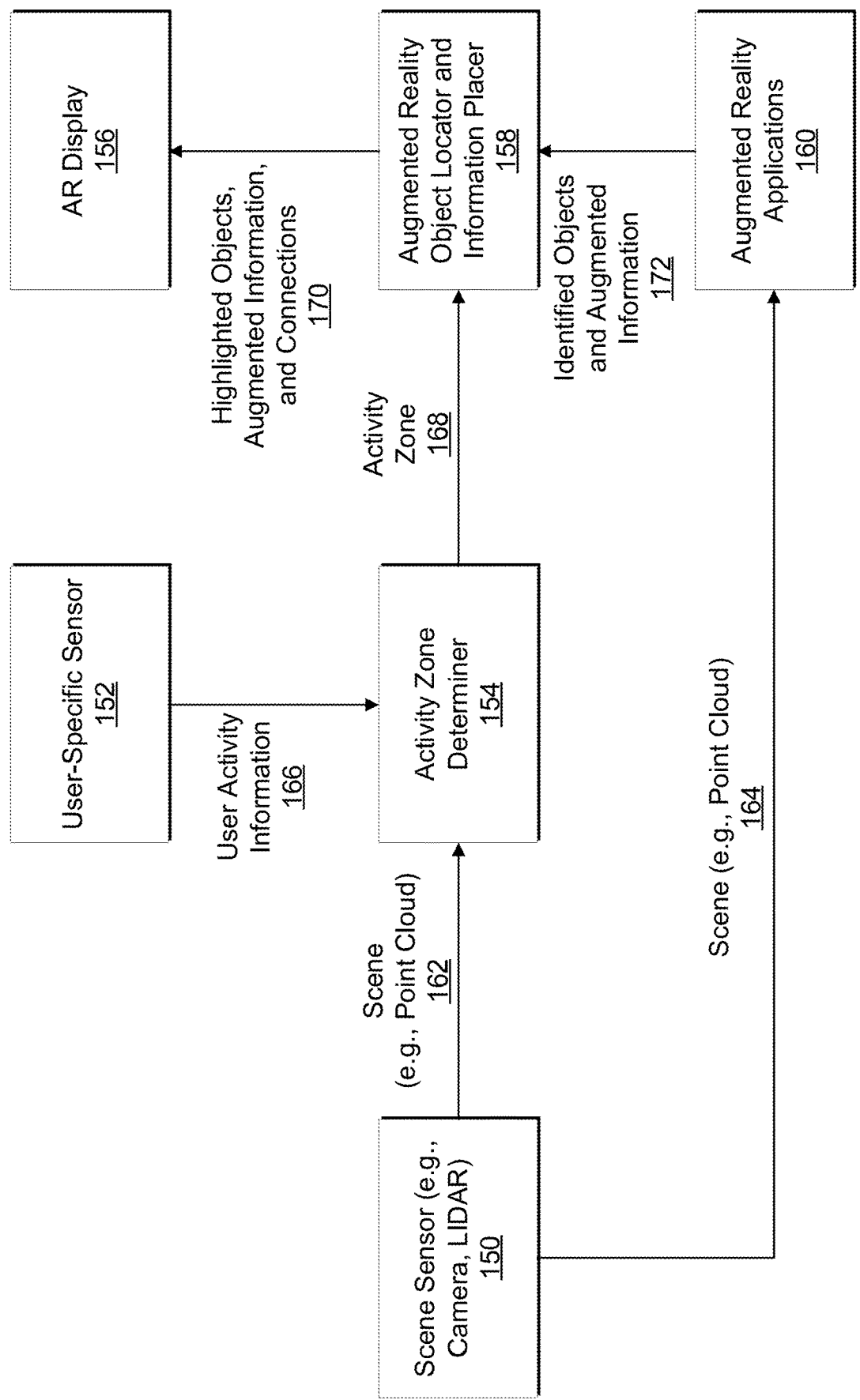
FIG. 1 is an interface diagram showing an AR system.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment . . . " For brevity and clarity of presentation, this implied leading clause is not repeated ad nauseum in the detailed description of the drawings.

DETAILED DESCRIPTION

In exemplary embodiments described herein, augmented reality annotations are displayed at a position as not to obstruct a user's view of a determined activity zone (or region). For example, when a user is moving in a particular direction, the augmented reality annotations may be positioned so as not to obstruct the users view in that direction of motion. For some exemplary embodiments, the user guides the direction of motion, e.g., while walking, riding a bicycle, driving a car, or riding a Segway. For such embodiments, the users direction of gaze may continually approximate the users direction of motion, even though the two directions may not be identical. If a user shifts his or her gaze to another direction, e.g., to read the AR information or to look at a highlighted object near the periphery, exemplary embodiments of methods or systems described herein will not cause AR information or associated graphics to move out of the way of the users gaze. Such embodiments may have greater stability to the user by displaying information out of the way. When a user is a passenger in a train or car, though, a users direction of gaze may be decoupled from the user's direction of motion.

One embodiment of a method disclosed herein tracks a direction of travel of a user of an augmented reality (AR) display, identifies an object having associated AR information, determines whether the direction of travel is substantially towards the object, selects a location for display of the AR information, wherein selecting the location comprises: selecting a first location at an offset from the object while the direction of travel is substantially towards the object, and selecting a second location that at least partially obscures the object while the direction of travel is not substantially towards the object, and displays the AR information at the selected location using the AR display.

For one or more embodiments, a method for displaying (or rendering) AR information about a real-world object in a users view (or AR display) may comprise multiple steps: receiving real-world object data, determining a user's activity zone, highlighting a real-world object based on where the real-world object lies with respect to the activity zone, displaying a real-world object's AR information outside an activity zone, and displaying an association of the AR information with a real-world object. An AR system may receive data regarding a real-world object, along with the object's coordinates in a system's visual field and associated augmented information. For one embodiment, determining a user's activity zone may comprise determining the users direction of motion as a straight line and determining a zone as a preset view angle centered on the user's direction of motion. For another embodiment, determining a user's activity zone may be based on a nonlinear direction of motion, such as a user walking on a curved path. Determining the users direction of motion as a straight line may comprise predicting motion based on (as appropriate): the major dimension of movement of the user, the orientation of the users body (including chest and feet), and the direction in which the user leans. For one embodiment, highlighting a real-world object based on where a real-world object lies with respect to an activity zone may comprise displaying subtle highlighting (such as a silhouette or a soft glow overlay) for the object if the object is displayed within the activity zone and displaying prominent (or strong) highlighting (such as hatching) for the object if the object is displayed outside the activity zone. For one embodiment, a real-world object's AR information may be displayed at a point along the outside periphery of the activity zone closest to the object. For one embodiment, displaying an association of AR information with a real-world object may comprise highlighting the AR information in a way that matches the highlighting of the real-world object and displaying a line linking the AR information with the real-world object, which may comprise subtle lines for within-zone objects and prominent lines for outside-zone objects.

Prominent highlighting may differ from subtle highlighting in one or more of various different properties. For example, as compared to subtle highlighting, prominent highlighting may have one or more of a greater opacity, greater line thickness, greater brightness, greater color saturation, or other properties indicative of prominence.

FIG. 1 shows a process interface diagram of an AR system 100. A scene sensor 150, such as a camera or LIDAR system, captures image data. For one embodiment, scene sensors 150 measure information about a scene 162, e.g., as a point cloud, and communicate such scene information to an Activity Zone Determiner 154 and to augmented reality applications. User-specific sensors 152 may provide information about a user, such as orientation of a users chest or the angle of a user's shoes. Augmented Reality applications 160 (or apps) or services external to systems and methods described herein may receive data related to identified real-world objects along with information to display in an augmented manner. An AR application 160 may communicate identified objects and augmented information 172 to an augmented reality and object locator and information placer 158. An Activity Zone Determiner 154 may determine an activity zone 168 for a scene and communicate information used to describe the activity zone to an augmented reality object locator and information placer 158. A user-specific sensor 152 may measure user-specific data and communicate user activity information 166 to an Activity Zone Determiner 154. An Activity Zone Determiner 154 may use data from user-specific sensors 152 to determine a user's activity zone 168 comprising of the region of the visual field that may be relevant or most relevant to a users activity. For one embodiment, the activity zone may be determined from the user's direction of motion by estimating where the user may arrive within a small duration (such as five seconds) with a diameter corresponding to an inner part of the visual field. For one embodiment, such an inner part of the visual field may be a "near peripheral" area that is a wedge-shaped area centered on an axis of motion with angles of 30° clockwise and counterclockwise from a center direction directly in front on a users eye. For example, if a user is walking, an Activity Zone Determiner 154 may determine a zone as the part of the visual field that includes where the user may be within ten or fewer steps. An Augmented Reality Object Locator and Information Placer 158 may locate identified objects with respect to an activity zone 168 and determine subtle or prominent highlights 170, as appropriate. An Augmented Reality Object Locator and Information Placer 158 may determine locations outside an activity zone 168 for augmented information 170 associated with these objects that minimizes the distance between the augmented information 170 and the associated objects and may determine a display style for a connection 170 between an identified object and an identified object's associated augmented information 170. For one embodiment, object highlight data, augmented information, and connection line display data 170 is communicated to an AR display 156 (or display). An AR display 156 may display augmented information to a user. For one embodiment, augmented information, connection line display data, and object highlight data may be used to display data to a user.

For some embodiments, an AR device comprises the components illustrated in FIG. 1: scene sensor, Activity Zone Determiner 154, user-specific sensor(s), augmented reality application(s), Augmented Reality Object Locator and Information Placer 158, and an AR display 156. For some embodiments, for example, scene sensors 150 may use a camera integrated into a smart phone. Other scene and user-specific sensors may be integrated into a headset or AR glasses. For some embodiments, one or more scene sensors may be mounted to the top of a headset, along with user-specific sensors. For some embodiments, mounted to or otherwise coupled with a headset may be a processor for running software that implements an Activity Zone Determiner 154, an Augmented Reality Object Locator and Information Placer 158, and one or more AR applications 160. User-specific sensors may measure heartrate, walking or running speed, temperature, and these sensors may be integrated into a smart phone or other AR device. For some embodiments, an Activity Zone Determiner 154 and an Augmented Reality Object Locator and Information Placer 158 may be processes running on a processor within an AR device. For some embodiments, an AR display 156 may be a screen on a smart phone. For some embodiments, an AR display 156 may be a see-through display device, such as an AR-enabled vehicle windshield or AR optical see-through glasses or headset. For some embodiments, scene sensor data 162, 164 is measured by scene sensor 150 external to an AR device and communicated to an AR device. For some embodiments, user-specific sensor data is measured by devices external to an AR device and communicated to an AR device. For some embodiments, augmented reality applications 160 running on a device external to an AR device may communicate identified objects and augmented information to an AR device. For some embodiments, an AR device comprises an Activity Zone Determiner 154 and an Augmented Reality Object Locator and Information Placer 158, while AR applications 160, scene sensor(s) 150, user-specific sensor(s) 152, and an AR display 156 are external.

Figure 2:
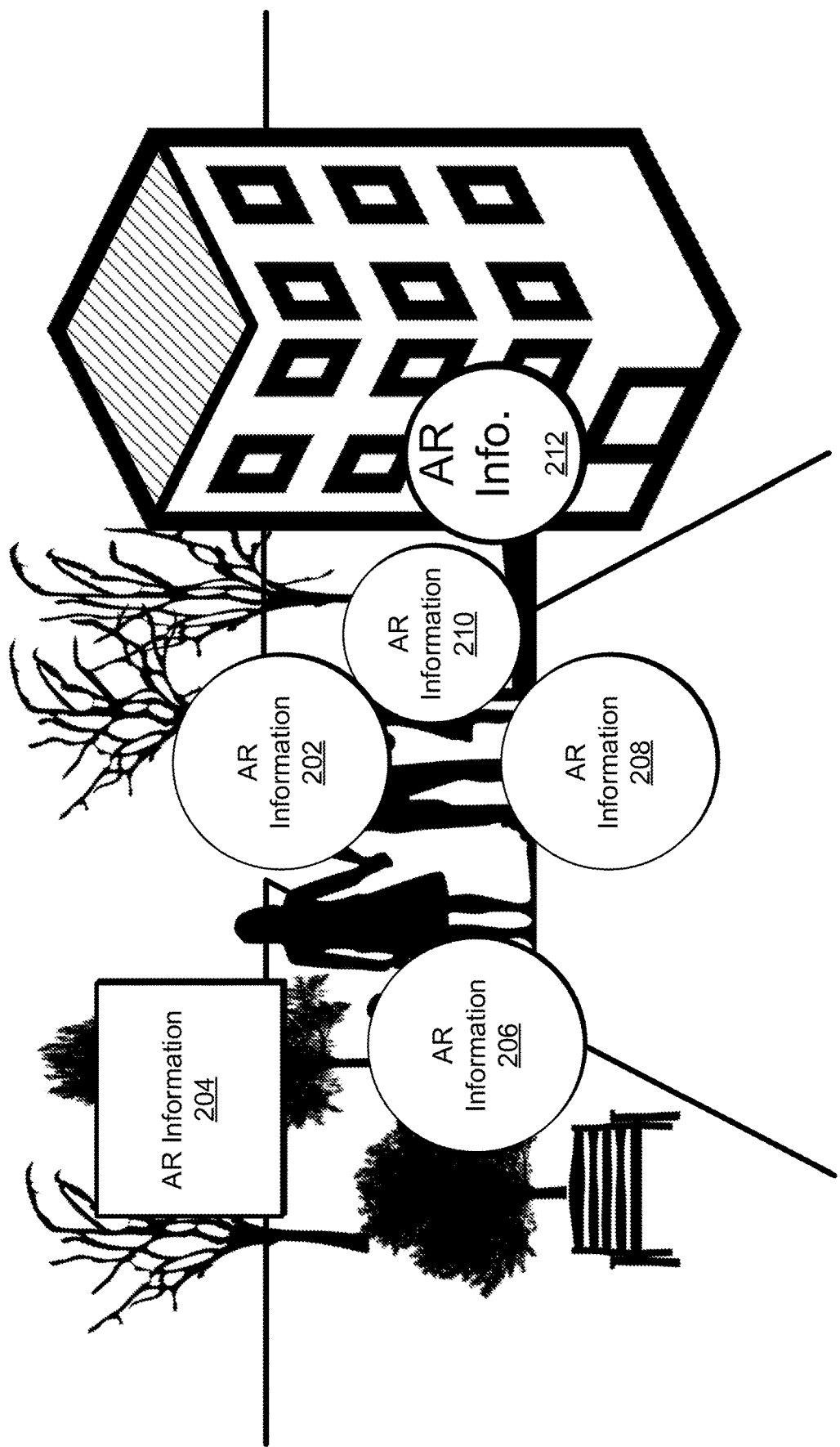
FIG. 2 is an example AR display with AR information obstructing a users view.

FIG. 2 shows an example display 200 within an AR device not using systems and methods described herein. AR information 202, 204, 206, 208, 210, 212 is scattered across the display area and obstructs the center of the user's vision.

Figure 3:
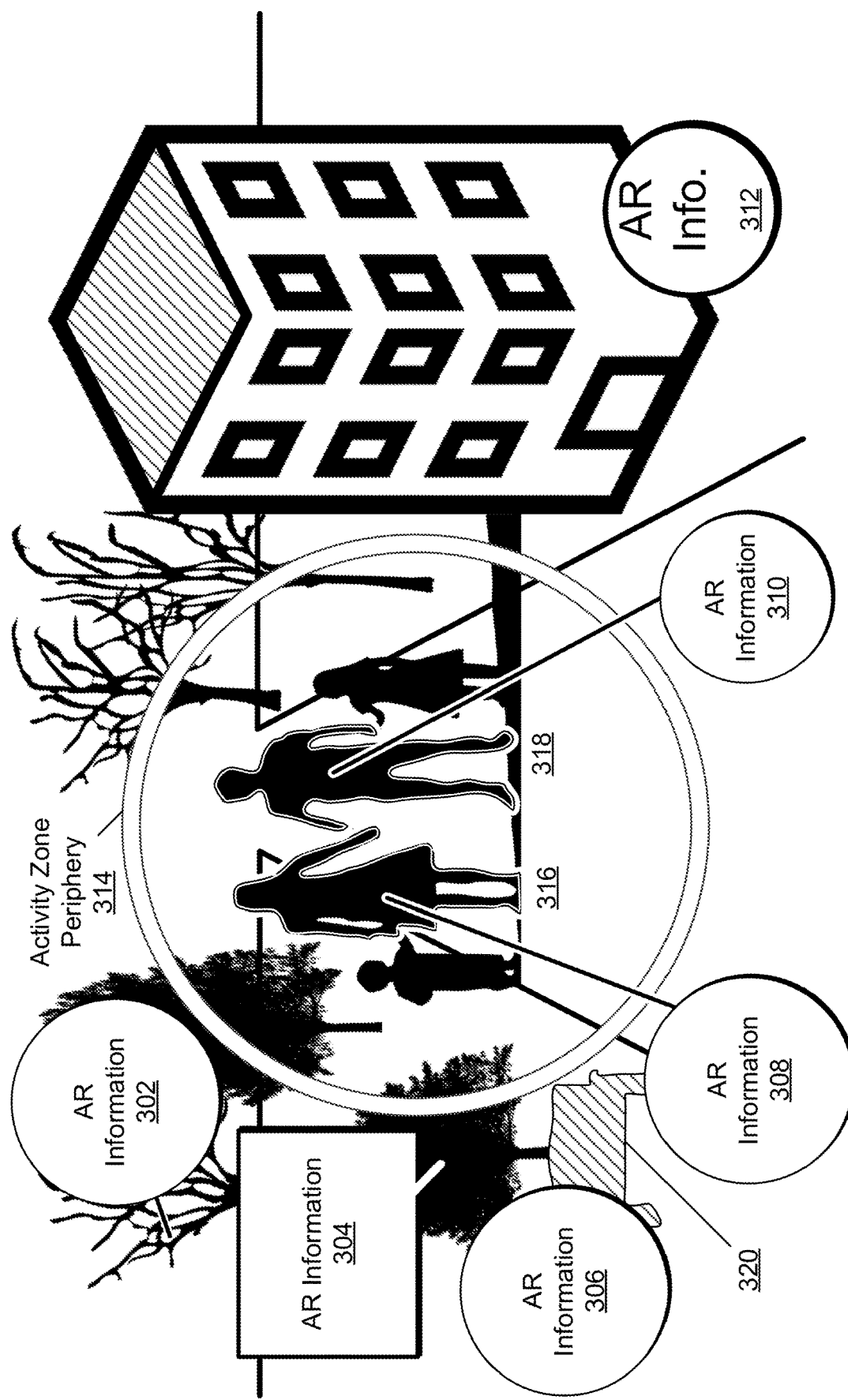
FIG. 3 is an example AR display with AR information displayed outside an activity zone.

FIG. 3 shows an example display 300 within an AR device using systems and methods described herein. For one embodiment, real-world objects 316, 318, 320 are highlighted either subtly or prominently based on whether an object is inside or outside an activity zone. For one embodiment shown in FIG. 3, the big circle is the periphery of an activity zone 314. AR information 302, 304, 306, 308, 310, 312 associated with real-world objects 316, 318, 320 are displayed on the periphery of the activity zone 314.

Figure 4:
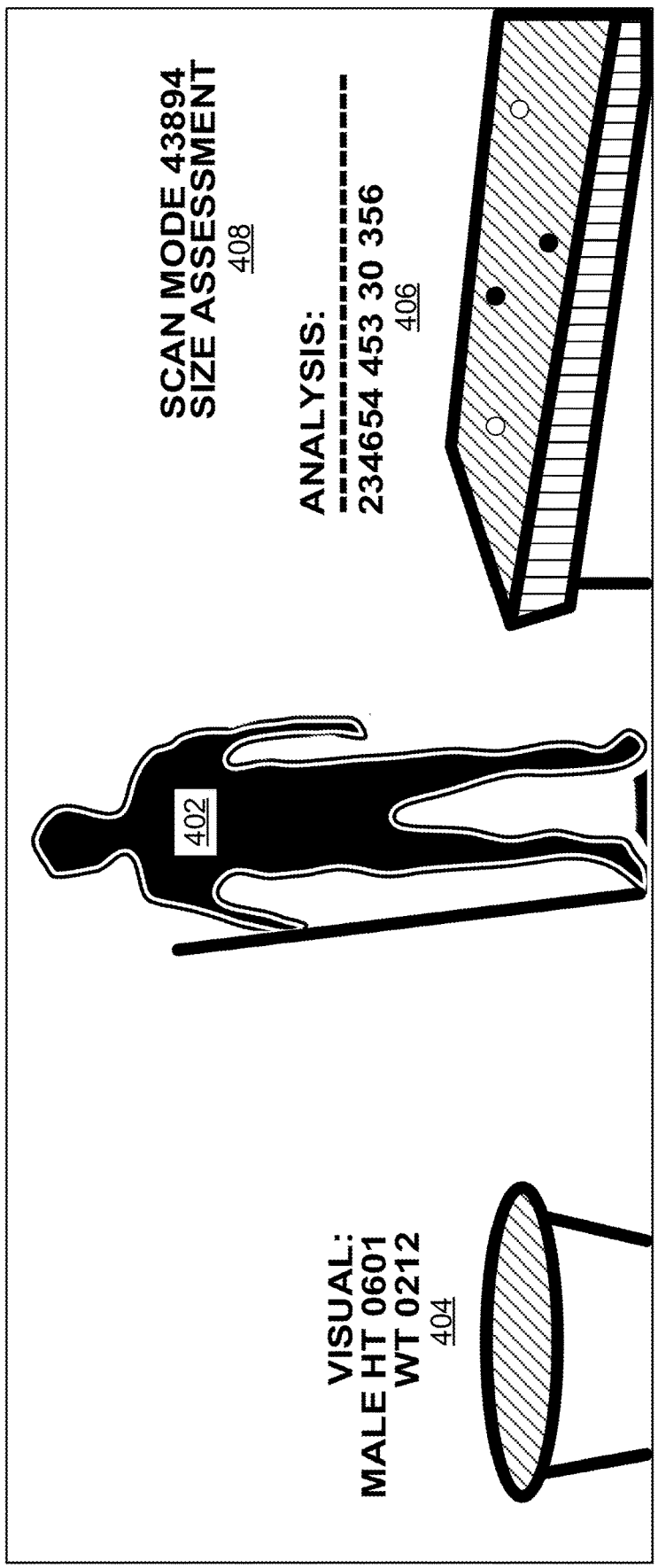
FIG. 4 is an example AR display with an activity zone surrounding a person in a user's field of view.

FIG. 4 shows an example AR display 400 with an activity zone surrounding a person 402 in a users field of view. AR information 404 regarding the person's gender, height, and weight are displayed to the left of the person. AR information 406, 408 related to other objects is displayed to the right of the person.

Figure 5:
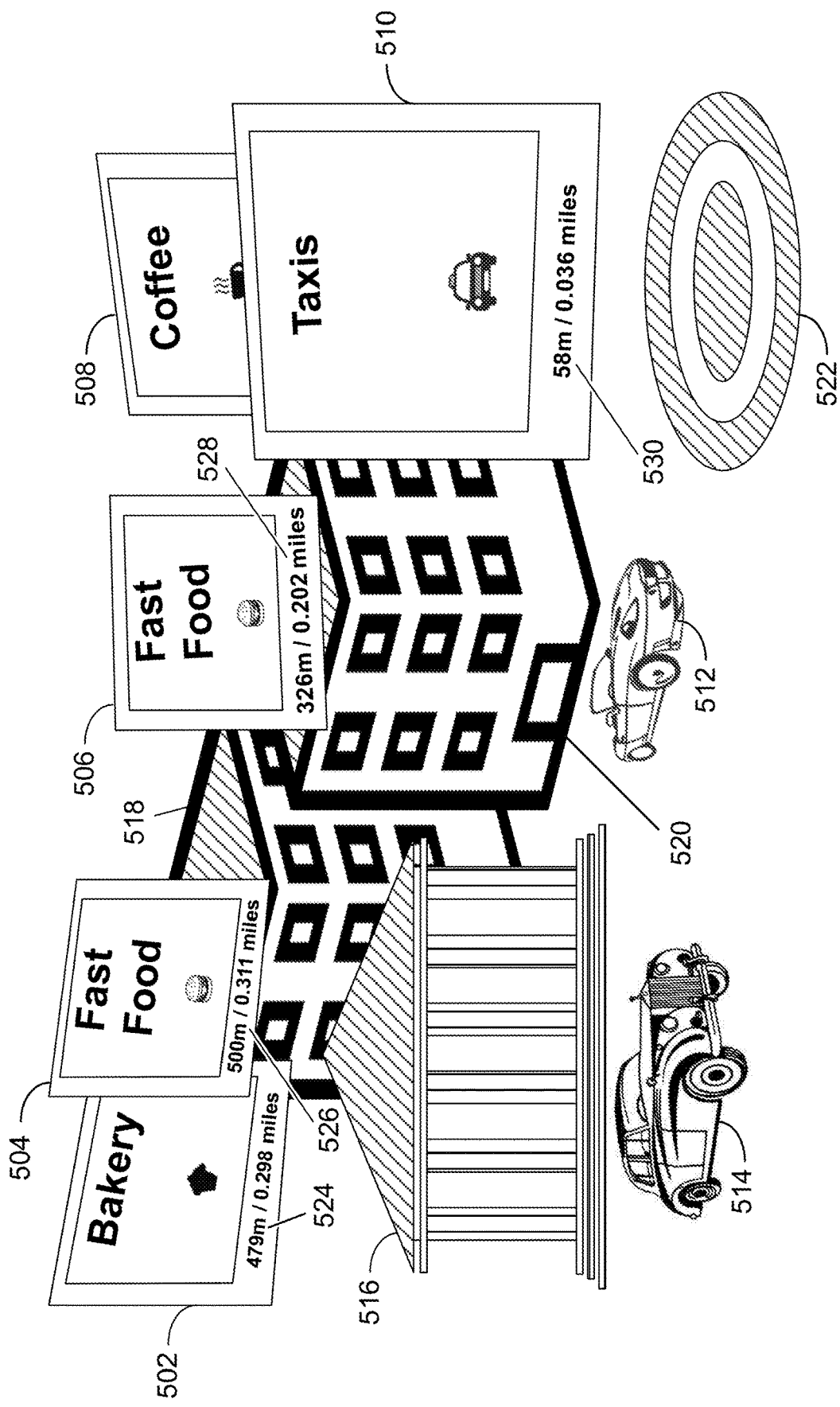
FIG. 5 is an example AR display with AR information displayed along the top and right side of an AR display.

FIG. 5 shows another example AR display. For this example, a user is walking around a city center. AR information is displayed along the top and right sides of the AR display. For this example, icons are displayed showing the locations of the nearest Laduree bakery, McDonald's fast food restaurants, Starbuck's coffee, and taxi stand, along with distances to each of these locations underneath each icon.

For some embodiments, an AR display is an optical see-through device. For some embodiments, an AR display is provided on a windshield of a vehicle. For some embodiments, an AR display is embedded in glasses or goggles. For some embodiments, an AR display renders all objects and graphics seen on a screen. For some embodiments, an AR display renders graphical overlays on top of optically-seen real-world objects.

For FIGS. 2 and 3, some embodiments may display the example white boxes, circles, and lines as graphical overlays on top of the optically-seen real-world objects represented by the black and white photograph. Similarly, for FIG. 4, some embodiments may display the text and white outline of the activity zone displayed around the person in the foreground as graphical overlays on top of the optically-seen real-world objects represented by the black and white photograph. For FIG. 5, one embodiment 500 may display a bakery icon 502, two fast food restaurant icons 504, 506, a coffee shop icon 508, and a taxi stand icon 510, along with distances 524, 526, 528, 530 to each of these locations as graphical overlays on top of optically-seen real-world objects 512, 514, 516, 518, 520, 522 represented by black and white drawings of real-world objects. For some embodiments, everything seen in FIGS. 2 to 5 may be rendered by an AR display.

Figure 6B:
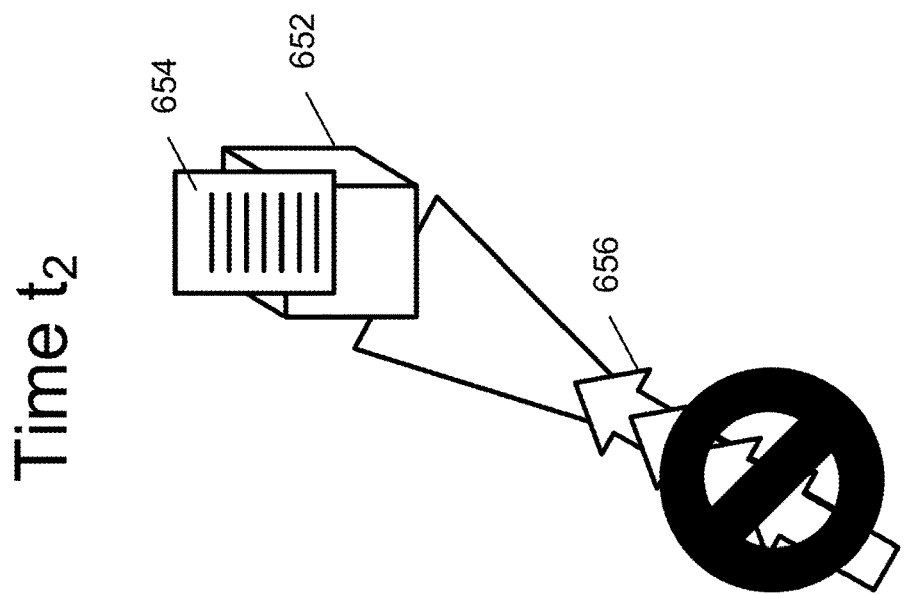
FIGS. 6A and 6B are perspective view schematic diagrams for the placement of AR information at two moments in time.
Figure 6A:
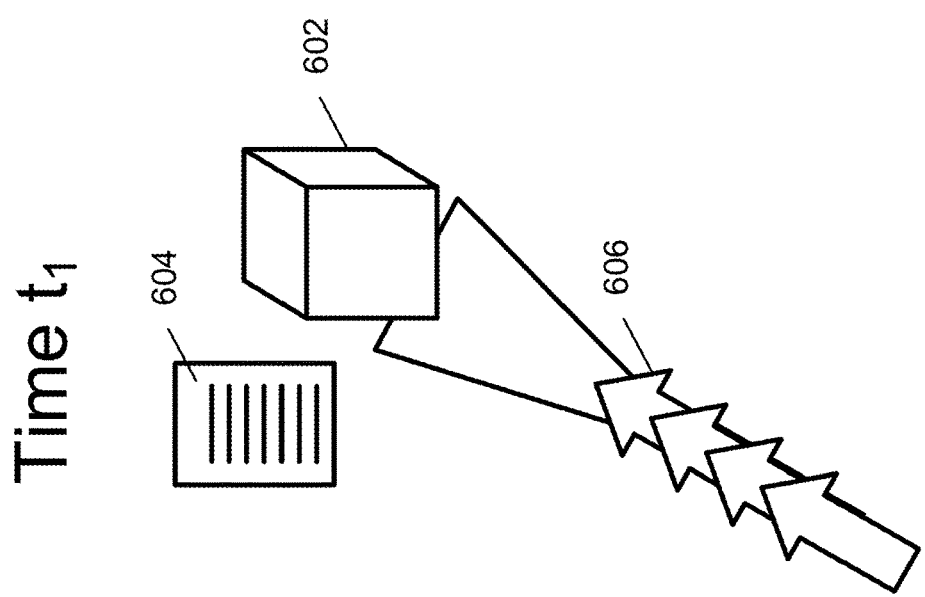

FIGS. 6A and 6B are perspective schematic diagrams 600, 650 for the placement of AR information 604, 654 at two moments in time. At time $t_1$, a user has been continually walking towards a real-world object 602, shown as a cube in FIG. 6A. AR information 604 related to the object is displayed to the left of the object 602 and the user's direction of motion 606. At time $t_2$, the user has substantially stopped moving 656 towards the object 652, as shown in FIG. 6B. AR information 654 related to the object 652 is displayed towards the top of the object 652. For some embodiments, responsive to a determination that the user has substantially stopped moving in the direction of travel, AR information associated with a real-world object may be rendered on an AR display at a location on the AR display that at least partially obscures the real-world object.

FIGS. 7A and 7B are perspective schematic diagrams 700, 750 for the placement of AR information 704, 754 at two moments in time when a user changes direction of motion. At time $t_1$, a user is walking towards a real-world object 702, shown as a cube in FIG. 7A. AR information 704 related to the object 702 is displayed to the left of the object and the user's direction of motion 706. At time $t_2$, the user turns to the left and starts walking to the left of the object 752, as shown in FIG. 7B. AR information 754 related to the object 752 is displayed towards the top of the object 752 and to the right of the users direction of motion 756.

Figure 8:
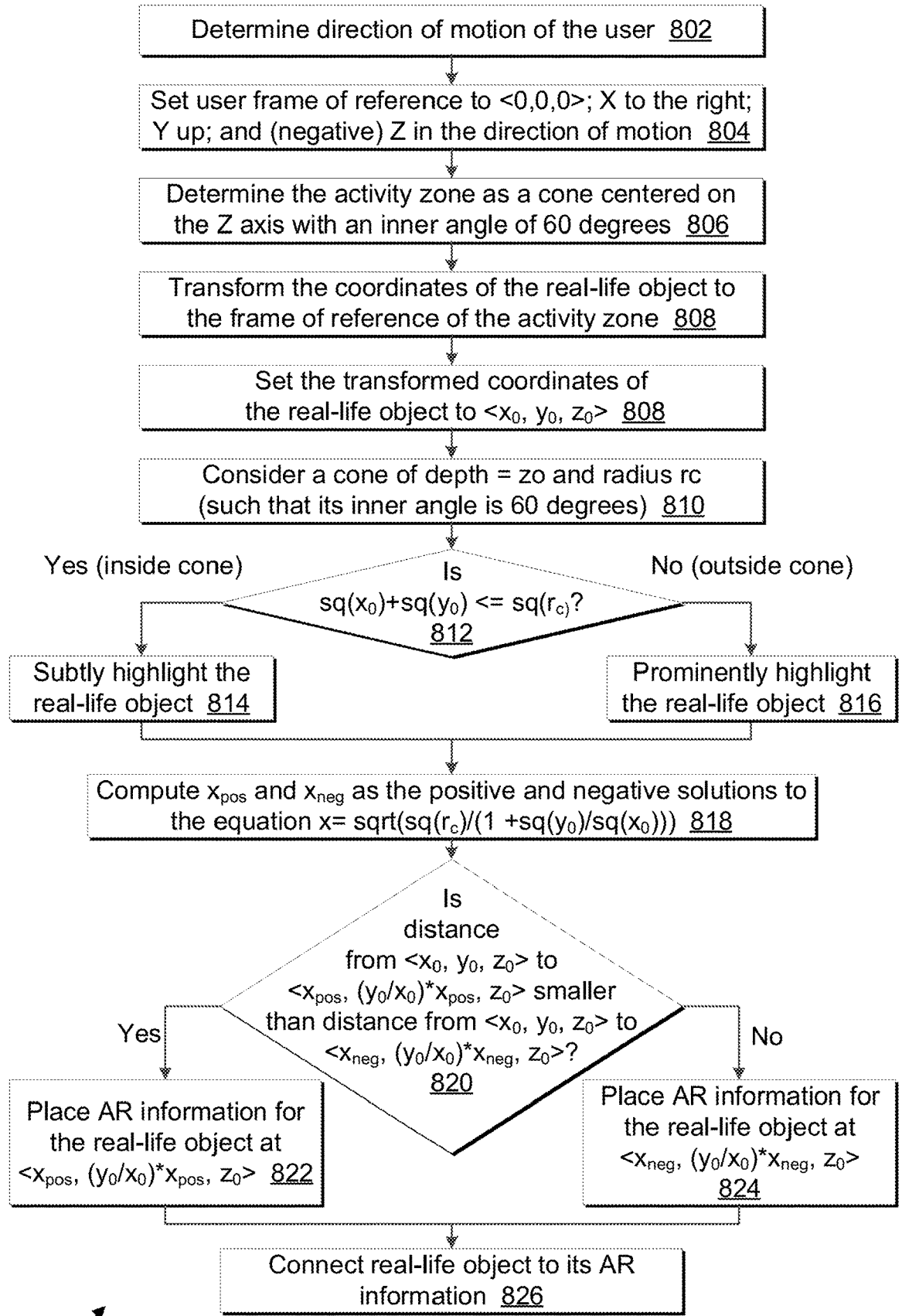
FIG. 8 is a flowchart showing an exemplary embodiment for determining a screen location for displaying AR information related to a real-world object.

FIG. 8 is a flowchart 800 for an exemplary embodiment for determining a screen location for displaying AR information related to a real-world object. For one embodiment, the direction of motion of the user is determined 802. A user frame of reference to location <0,0,0> within a coordinate system for the users motion may be set 804, where for one embodiment, positive x-axis values are to the right, positive y-axis values are up, and negative z-axis values are in the direction of the user's motion. For one embodiment, an activity zone is determined 806 as a cone (or conical region) centered on the z-axis with an inner angle of 60 degrees centered on the z-axis and the point of the cone centered on the user. For one embodiment, the coordinates of a real-world object are transformed 808 to the coordinate system for the frame of reference of the activity zone. For one embodiment, the real-world object's transformed coordinates are set 808 to $<x_0,y_0,z_0>$. For one embodiment, the activity zone is further determined 810 to be a cone of depth $z_0$ with a radius $r_c$ such that the cone's inner angle is 60 degrees. For one embodiment, a process determines 812 if $x_0^2+y_0^2 \leq r_c^2$. If $x_0^2+y_0^2 \leq r_c^2$, the real-world object is inside the activity zone's cone and subtle highlighting is added 814 to the real-world object on the AR display. Otherwise (for the same embodiment), the real-world object is outside the activity zone's cone and prominent highlighting is added 816 to the real-world object on the AR display.

For some embodiments, subtle highlighting comprises displaying a non-clear transparency on top of the real-world object. For some embodiments, subtle highlighting comprises displaying transparent colors with an intensity level less than a predetermined threshold. For some embodiments, subtle highlighting comprises displaying a transparent color associated with a highlighter, such as light pink, light orange, light yellow, light green, light blue, or light purple. For some embodiments, subtle highlighting comprises displaying a thin-line graphic around the real-world object or displaying a thin line connecting the real-world object to augmented information.

For some embodiments, prominent highlighting comprises displaying an opaque color on top of the real-world object. For some embodiments, prominent highlighting comprises displaying opaque colors with an intensity level greater than a predetermined threshold. For some embodiments, prominent highlighting comprises displaying an opaque color, such as solid red, solid orange, solid yellow, solid green, solid blue, or solid purple. For some embodiments, prominent highlighting comprises displaying a thick-line graphic around the real-world object or displaying a thick line connecting the real-world object to augmented information.

For one embodiment, $x_{pos}$ and $x_{neg}$ are calculated 818 as the two solutions to Eqn. 1.

$$x = \pm \sqrt{\frac{r_c^2}{1+\frac{y_0^2}{x_0^2}}} \qquad \text{Eqn. 1}$$

For one embodiment, a process compares 820 the distance from $<x_0,y_0,z_0>$ to $$<x_{pos},\left(\frac{y_0}{x_0}\right)(x_{pos}),z_0>$$

with the distance from $<x_0,y_0,z_0>$ to $$<x_{neg},\left(\frac{y_0}{x_0}\right)(x_{neg}),z_0>.$$

If the distance from $<x_0,y_0,z_0>$ to $$<x_{pos},\left(\frac{y_0}{x_0}\right)(x_{pos}),z_0>$$

is smaller than the distance from $<x_0,y_0,z_0>$ to $$<x_{neg},\left(\frac{y_0}{x_0}\right)(x_{neg}),z_0>,$$

the augmented reality information for the real-world object is displayed 822 at $$<x_{pos},\left(\frac{y_0}{x_0}\right)(x_{pos}),z_0>.$$

Otherwise (for the same embodiment), the augmented reality information for the real-world object is displayed 824 at $$<x_{neg},\left(\frac{y_0}{x_0}\right)(x_{neg}),z_0>.$$

For one embodiment, a connection graphic is displayed 826 to connect the AR information to the real-world object.

Figure 9:
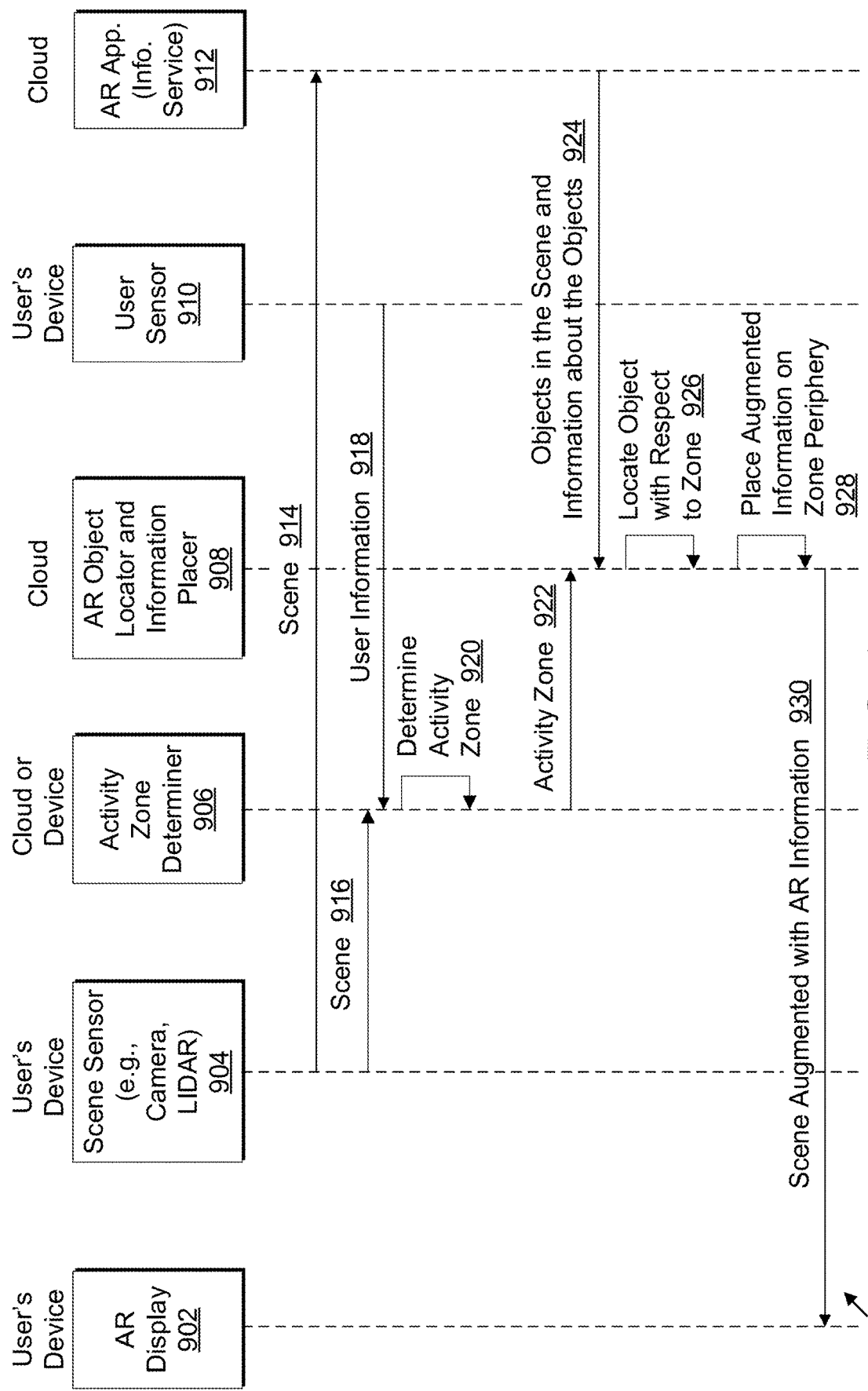
FIG. 9 is a message sequence diagram for messages communicated between processes and devices for displaying AR information for an exemplary embodiment.

FIG. 9 shows a message sequence diagram 900 for messages communicated between processes and devices for displaying AR information for an exemplary embodiment. A location is listed above each device or process for an exemplary embodiment. A Scene Sensor 904 transmits 914, 916 scene data (such as point cloud) to an Activity Zone Determiner 906 and to an AR Application (which may be an information service). A User Sensor 910 may also transmit 918 user information to an Activity Zone Determiner 906. For one embodiment, an Activity Zone Determiner 906 determines 920 an activity zone and transmits 922 a message describing the activity zone to an AR Object Locator and Information Placer 908. An AR Object Locator and Information Placer 908 also may receive 924 a message from an AR Application 912 with location data for real-world objects in a scene and augmented information about those real-world objects. An AR Object Locator and Information Placer 908 determines 926 a location of the real-world object with respect to the activity zone and for one embodiment, generates 928 scene data that may be used to display augmented information on the periphery of an activity zone. The AR Object Locator and Information Placer 908 may send 930 a message to an AR Display 902 with scene data augmented with AR information.

Figure 10:
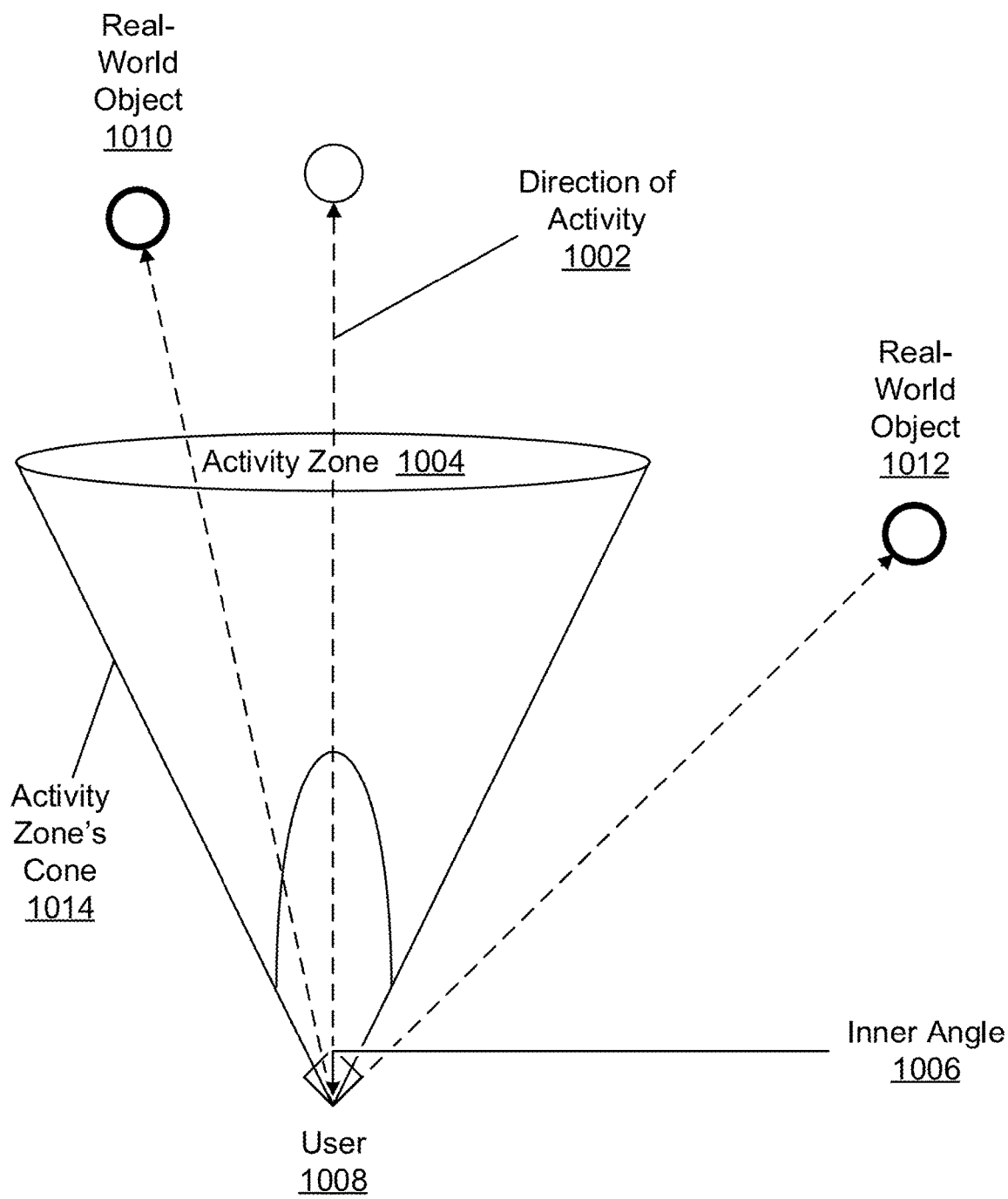
FIG. 10 is a plan view schematic diagram of a two-dimensional coordinate system showing a user and an activity zone.

FIG. 10 shows a plan view schematic 1000 for a user 1008 and an activity zone 1004. For this example, real-world objects 1010, 1012 are shown as dark, bold circles, while the direction of travel 1002 is shown with an arrow pointing directly up towards a normal width circle. For this example, a sample activity zone 1004 is shown as three-dimensional oval centered on the direction of activity (or travel). For this embodiment, an inner angle 1006 of 60 degrees is shown for a cone associated with the activity zone 1004. For this embodiment, the cone's apex is centered upon the user 1008.

For an exemplary embodiment, an activity zone 1004 is determined using a user's chest and foot orientation based on sensor readings located on a users body. Another embodiment uses camera image data in the infrastructure surrounding the user. One embodiment uses one or more motion sensors, such as a GPS, a compass, an accelerometer, or a gyroscope, on a user's device to calculate a main direction of travel. For one embodiment, if an accelerometer or gyroscope is used, a GPS or other location device may be used to calculate a main direction of travel. For one embodiment, a compass may be used to determine a main direction of travel. For one embodiment, two or more GPS readings may be used to determine a main direction of travel. An example of techniques that may be used to determine a user's direction of travel include those described in Gabor Paller, *Motion Recognition with Android Devices*, SFONGE LTD. (Oct. 7, 2011), http://www.slideshare.net/paller/motion-recognition-with-android-devices (see slide 33).

For some embodiments, an activity zone 1004 is calculated based on a direction of travel. For some embodiments, an activity zone's cone 1014 has an opening angle is 60 degrees and whose apex is at the center of a users device (alternatively, the center may be at the users eyes or the device's camera) and which is centered about the ray corresponding to the user's direction of motion. The height (in math terminology), which is the depth in the present setting, of the cone 1014 corresponds to how far the user may see. For some embodiments, there is a cone 1014 for each height (e.g., one cone for 3 feet and another cone for 3.1 feet). Some real-world objects project inside and some do not.

Figure 11:
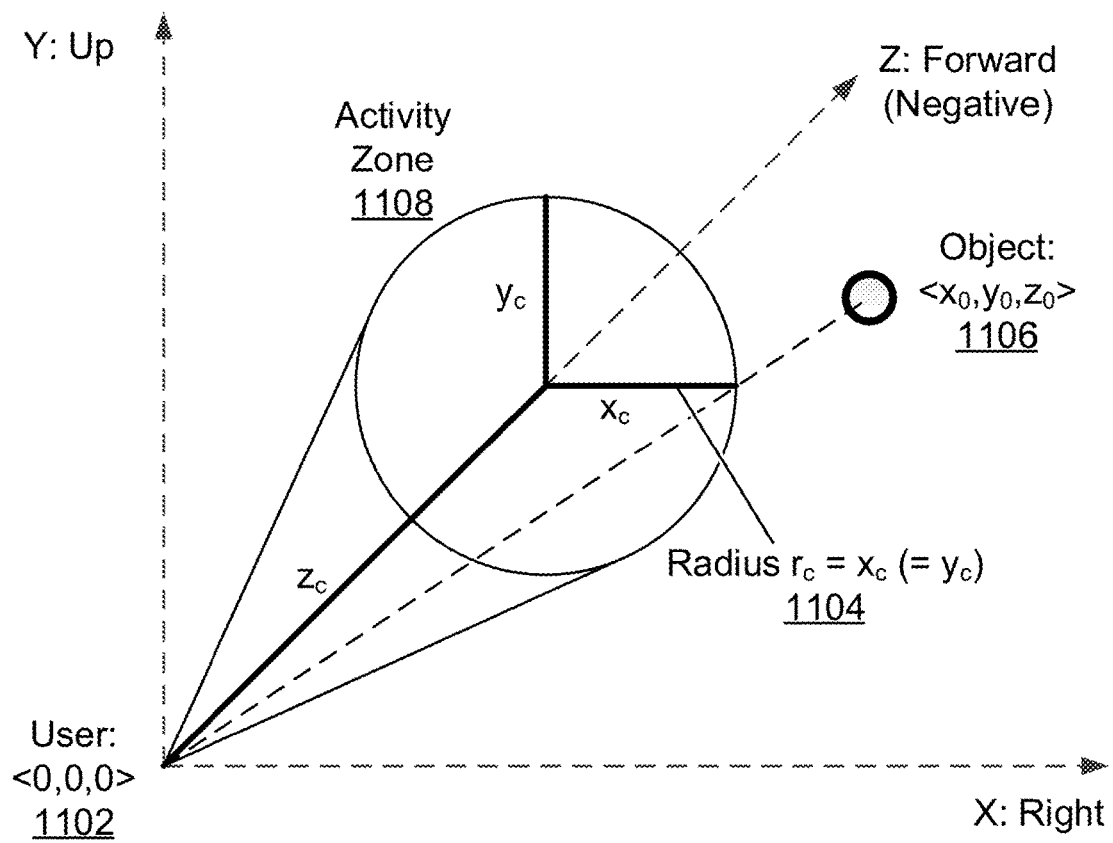
FIG. 11 is a perspective view schematic diagram of a three-dimensional coordinate system showing a user and a real-world object.

FIG. 11 shows a three-dimensional coordinate system 1100 with a frame of reference for a user 1102 with an origin aligned with the user 1102 and the z-axis along the users direction of motion. For some embodiments, coordinates for an activity zone 1108 and coordinates received for a real-world object 1106 may be used with geometric equations to determine whether a real-world object 1106 is inside or outside an activity zone 1108. For one embodiment, the labeling of x, y, and z coordinates follow the Android convention, which are described in Freescale Semiconductor's Application Note 4317 found at http://cache.freescale.com/files/sensors/doc/app_note/AN4317.pdf (see page 2, FIG. 1). For the example Android coordinate convention, the screen of the device is perpendicular to ground and facing the user. The x-axis is to the right; the y-axis is toward the sky; and the z-axis is parallel to the ground and toward the user. Points behind the screen have negative z-axis values. Some embodiments have the origin at the bottom left of the screen. For an exemplary embodiment used herein, the origin is in the middle of the screen. The device's screen may be small relative to the real world in target applications, so the error between these two embodiments may not be significant.

For some embodiments, scene data is received, which may be a point cloud. The scene data may correspond to what a user sees naturally in the real-world environment. For an object in a scene, a ray may exist that goes from the coordinate system's origin to the object. For objects with a nonzero extent, multiple rays may exist that go from the origin to the different sides of the object. For some embodiments, the coordinate system may be transformed from the received scene data (which may be a point cloud) to a coordinate system aligned with the user direction of motion, which may have negative z-axis values in the direction of motion. The angle between an object's ray and a z-axis aligned with the users direction of motion may be calculated. If this calculated angle is less than half the opening angle of the cone, the real-world object may be determined to lie inside the activity zone. Otherwise, for this embodiment, the real-world object may be determined to lie outside the activity zone. Some embodiments may make these determinations based on calculations using a real-world object's coordinates without calculating the angle between the two rays described above.

For one embodiment shown in FIG. 11, an activity zone 1108 has at least one cone with an apex at the origin and a base centered on the Z axis. For one embodiment, the radius/height 1104 equals the tangent of 30 degrees or 0.577. That is, $$\frac{r_c}{z_c} = \frac{x_c}{z_c} = \frac{y_c}{z_c} = 0.577.$$

One embodiment has a real-world object at coordinates $<x_0, y_0, z_0>$. This embodiment may have a cone that has the same depth as the object ($z_c = z_0$). For this example, the object is within the users activity zone if $x_0^2 + y_0^2 \leq r_c^2$. If the object is within the users activity zone, the AR information corresponding to the object may be displayed as a point along the outside periphery of the activity zone closest to the object. For one embodiment, augmented information is displayed at a point on the periphery of the activity zone closest to the real-world object. For one embodiment, this point is determined through use of the Pythagorean Theorem and geometric calculation. A line linking the real-world object to the associated augmented information may be displayed between the two items.

Figure 12:
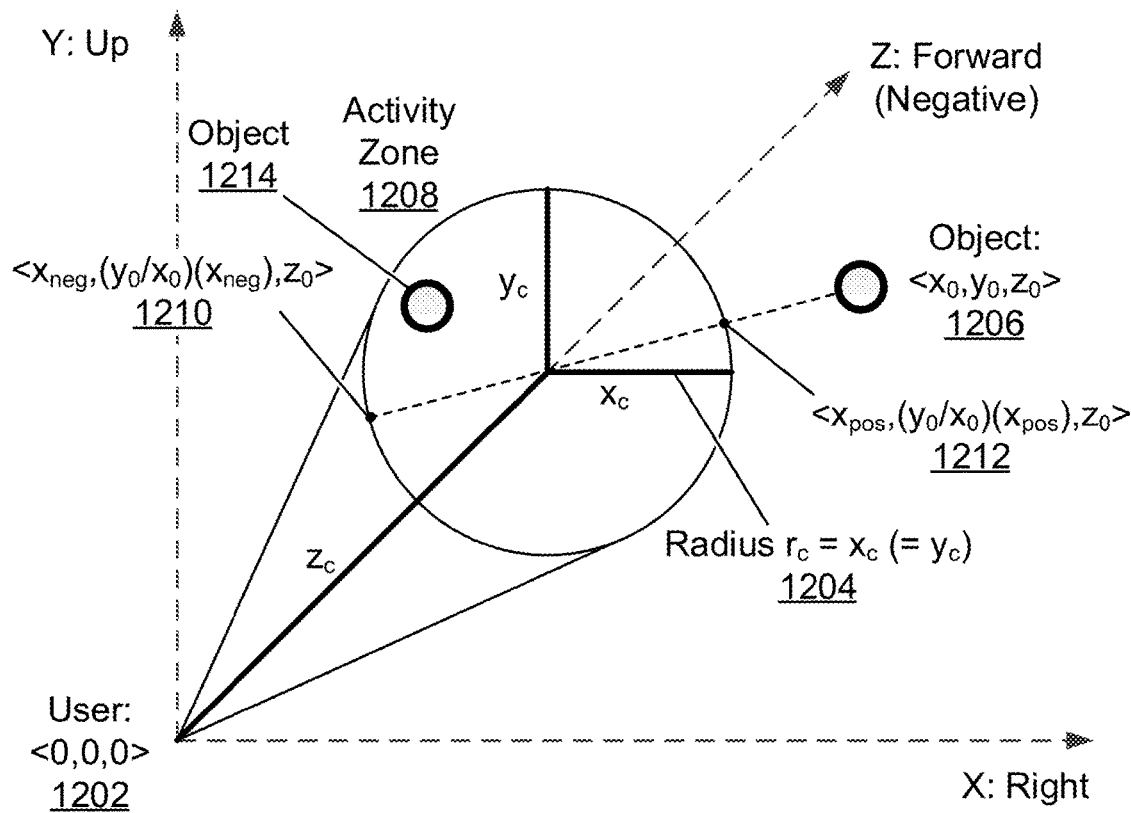
FIG. 12 is a perspective view schematic diagram of a three-dimensional coordinate system showing a user and two real-world objects.

FIG. 12 is a three-dimensional coordinate system 1200 centered on a user 1202 showing a real-world object 1206 and placement of augmented information. For one embodiment, a real-world object 1206 is at $<x_0, y_0, z_0>$ and the center of a cone's base is at $<0, 0, z_0>$. FIG. 12 shows one object 1214 located inside and one object 1206 located outside an example activity zone 1208. For this example, both real-world objects and the cone's base are in the same plane, located at $z = z_0$, and the equations that follow are for the x-axis and y-axis values. The radius 1204 of the cone's base is $r_c$. For this example, the slope s of the line from the object to the center of the base of the cone is $$s = \frac{y_0}{x_0}.$$

This line intersects the circle at the base of the cone at two points 1210, 1212 that satisfy the following Pythagorean Theorem and straight-line equations 2 to 6:

$$x^2 + y^2 = r_c^2 \qquad \text{Eqn. 2}$$

$$y = s * x \qquad \text{Eqn. 3}$$

$$x^2 + (sx)^2 = r_c^2 \qquad \text{Eqn. 4}$$

$$(x^2)(1 + s^2) = r_c^2 \qquad \text{Eqn. 5}$$

$$x = \pm \sqrt{\frac{r_c^2}{1 + s^2}} \qquad \text{Eqn. 6}$$

For this example, the equations may be used to calculate two solutions, which are the positive ($x_{pos}$) and negative ($x_{neg}$) values of x that lie on the circle and the corresponding values of y, which may be positive or negative depending upon the slope. For this example, the equation solutions are $<x_{pos}, (s)(x_{pos})>$ and $<x_{neg}, (s)(x_{neg})>$. Substituting $$\frac{y_0}{x_0}$$

for the slope s gives $$< x_{pos}\left(\frac{y_0}{x_0}\right)(x_{pos})\rangle \text{ and } \langle x_{neg}, \left(\frac{y_0}{x_0}\right)(x_{neg}) >.$$

The augmented information may be displayed at the <x,y> location that has a shorter distance to the real-world object. For this example, the calculations are the same if the object is inside or outside the cone.

Figure 13:
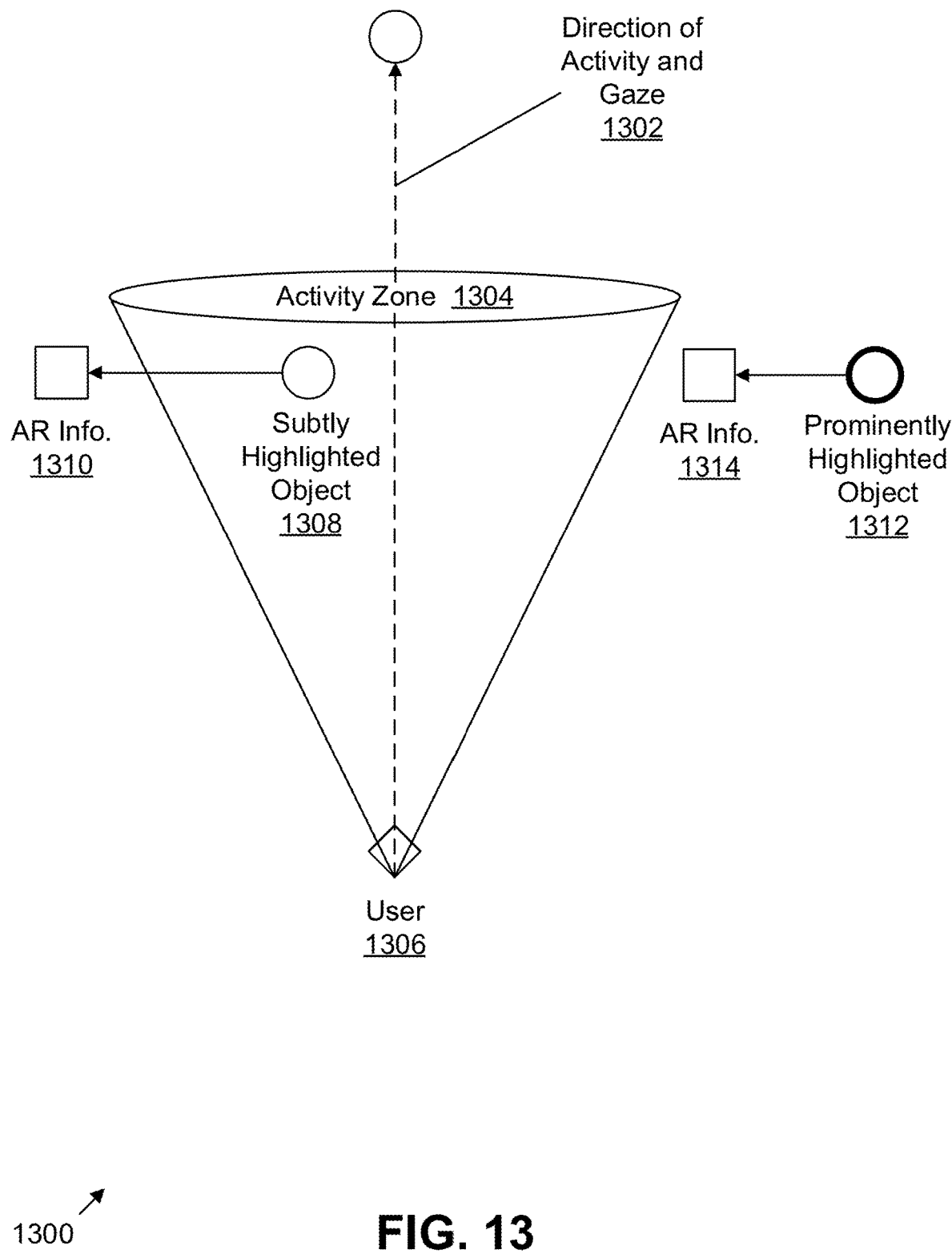
FIG. 13 is a plan view schematic diagram of an AR display showing two real-world objects and associated AR information.

FIG. 13 is a plan view schematic 1300 (or bird's eye view) of a user 1306 and two real-world objects 1308, 1312. For one embodiment, a graphic is displayed in front of a user 1308 to indicate the periphery of the user's activity zone 1304. For another embodiment, a graphic is not displayed in front of a user 1306 to indicate the periphery of the users activity zone 1304. For this example, the user's gaze 1302 is aligned with the users activity zone 1304. For exemplary embodiments, augmented information, except for subtle highlights and linkages to AR information displayed along the periphery of the activity zone 1304, is not displayed within the activity zone 1304. AR information 1310, 1312 for remote objects may be displayed outside but near the activity zone. As shown in the embodiment of FIG. 13, AR information 1310, 1314 is displayed away from a user's gaze direction 1302. One object 1308 located within an activity zone 1304 and within a users gaze direction 1302 is highlighted subtly, while another object 1312 located outside an activity zone 1304 and outside a user's gaze direction 1302 is highlighted prominently.

Figure 14:
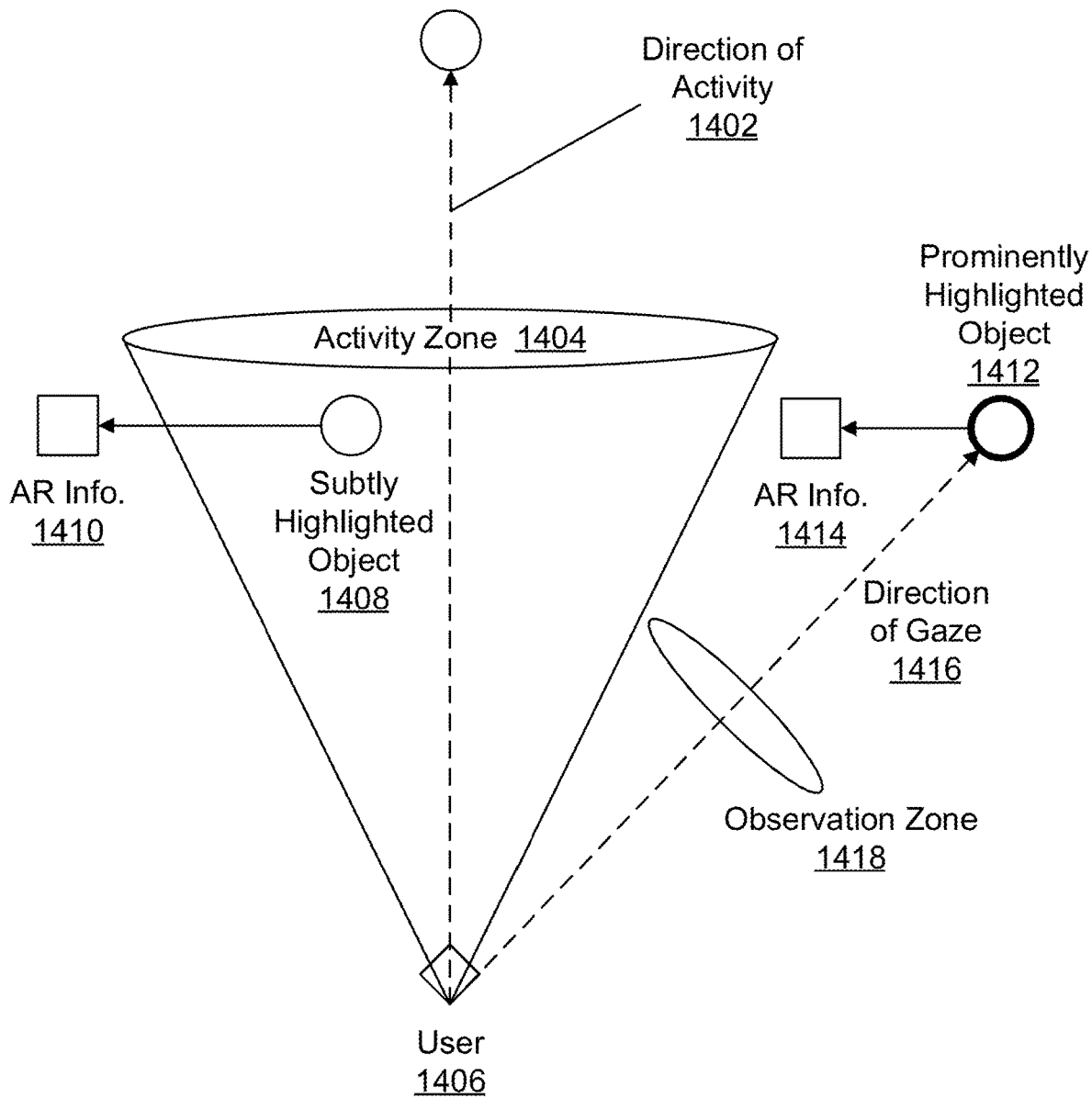
FIG. 14 is a plan view schematic diagram of an AR display showing two real-world objects and associated AR information, along with an activity zone and an observation zone.

FIG. 14 is a schematic plan view 1400 (or bird's eye view) of a user 1406 and two real-world objects 1408, 1412. For this embodiment, a users activity zone 1404 is displayed aligned with a direction of activity 1402 in front of the user 1406, but the users gaze 1416 is off center and to the right. The user 1406 may be looking at a highlighted object 1412 (as shown in FIG. 14), AR information 1414 for an object 1412, or an object without highlighting. Similar to the embodiment shown in FIG. 13, the activity zone 1404 remains clear of augmented information except for subtle highlights and linkages to AR information on the periphery of the activity zone. AR information 1410, 1414 for the remote objects 1408, 1412 may be displayed outside but near the activity zone 1404. The observation zone 1418 is the part of the AR display where the user 1406 is looking that is outside of the activity zone 1404. The observation zone 1418 may be cluttered with AR information while the activity zone 1404 remains free of clutter. As shown in the embodiment of FIG. 14, the activity zone 1404 remains stable. For this embodiment, if a user's gaze 1416 shifts, AR information 1414 shown within the scene may not move (or "jump around"). For this embodiment, the activity zone 1404 may become peripheral to the user's vision but the activity zone 1404 continues to the clear. For one embodiment, if the user 1406 looks at AR information 1414 outside an activity zone 1404, that AR information 1414 does not move (or "bounce away"), which would occur if AR information 1414 always was displayed outside the user's direction of gaze 1416. The embodiment shown in FIG. 14 uses both an activity zone 1404 and an observation zone 1418 in determining where to display AR information for a seamless AR user experience.

For one embodiment, an activity zone is determined to be a cone-shaped area with an apex centered on a user's (or viewer's) head with an opening angle of 60 degrees and a z-axis plane aligned with a displayed object located at a maximum distance from the user in the direction of travel (or as far as the user is able to see in the direction of travel). For one embodiment, no visual demarcation is displayed for the activity zone, unlike FIG. 3, which shows the activity zone as a thick circle. For some embodiments, a graphic may be rendered on an AR display that indicates a periphery of an activity zone. For one embodiment, an activity zone may be determined to be a distorted (or non-symmetrical) shape (instead of a symmetrical, conical, or circular shape) based on a users activity. For example, an activity zone may be wider than the height if a users activity is focused on the lower part of the scene. For one embodiment, an activity zone is a rectangle. For one embodiment, an activity zone is a plurality of disconnected shapes. For one embodiment, an activity zone is a three-dimensional shape. For one embodiment, determination of a user's activity zone is based not on a two-dimensional model but a three-dimensional model incorporating depth, where the activity zone may be a conical shape or three-dimensional part of the scene. For one embodiment, determination of a user's activity zone may be based, not on the users direction of motion, but on the salience of a part of the scene, such as, what objects appear in what part of the scene. For one embodiment, a users activity zone may have one or more salient objects based on the users activity. For one embodiment, an activity zone is not a contiguous region (or is a plurality of disconnected shapes). For one embodiment with real-world objects outside of an activity zone, associated AR information is displayed (or placed) near the object along with a marker at the periphery of the activity zone that indicates some AR information is available if the user looks toward the real-world object. For some embodiments, additional AR information may be displayed if the user looks toward current AR information.

Consumer Use Cases

For an example consumer use case, John uses some AR applications as he walks through New York City. His activity is recognized as walking and an associated activity zone is determined to be the path in front of him up to about 3 feet ahead. John is able to view his walking path because AR information received from his AR applications is not displayed in his direction of travel. For example, if John sees interesting people, such as celebrities, some AR apps display information about those people. This information is displayed outside the activity zone.

For another consumer user case, John runs into Mary while walking through Times Square. They have an animated conversation. His activity is determined to be chatting with Mary, and the associated activity zone changes to Mary's body frame (which may be a silhouette slightly larger than Mary). As John stands and chats with Mary, he looks left and right from time to time. Different real-world objects may come within view either within his activity zone (e.g., next to Mary's ear) or outside his activity zone (e.g., to the right and down the street). The AR information for these objects is placed outside John's activity zone. If John turns to read this information or to examine a real-world object in some detail, the AR information may change but none of the AR information obstructs his view of Mary.

Network Architecture

A wireless transmit/receive unit (WTRU) may be used as a AR display device in embodiments described herein. The AR device shown in FIGS. 15A to 15B may be used to retrieve AR information.

Figure 15A:
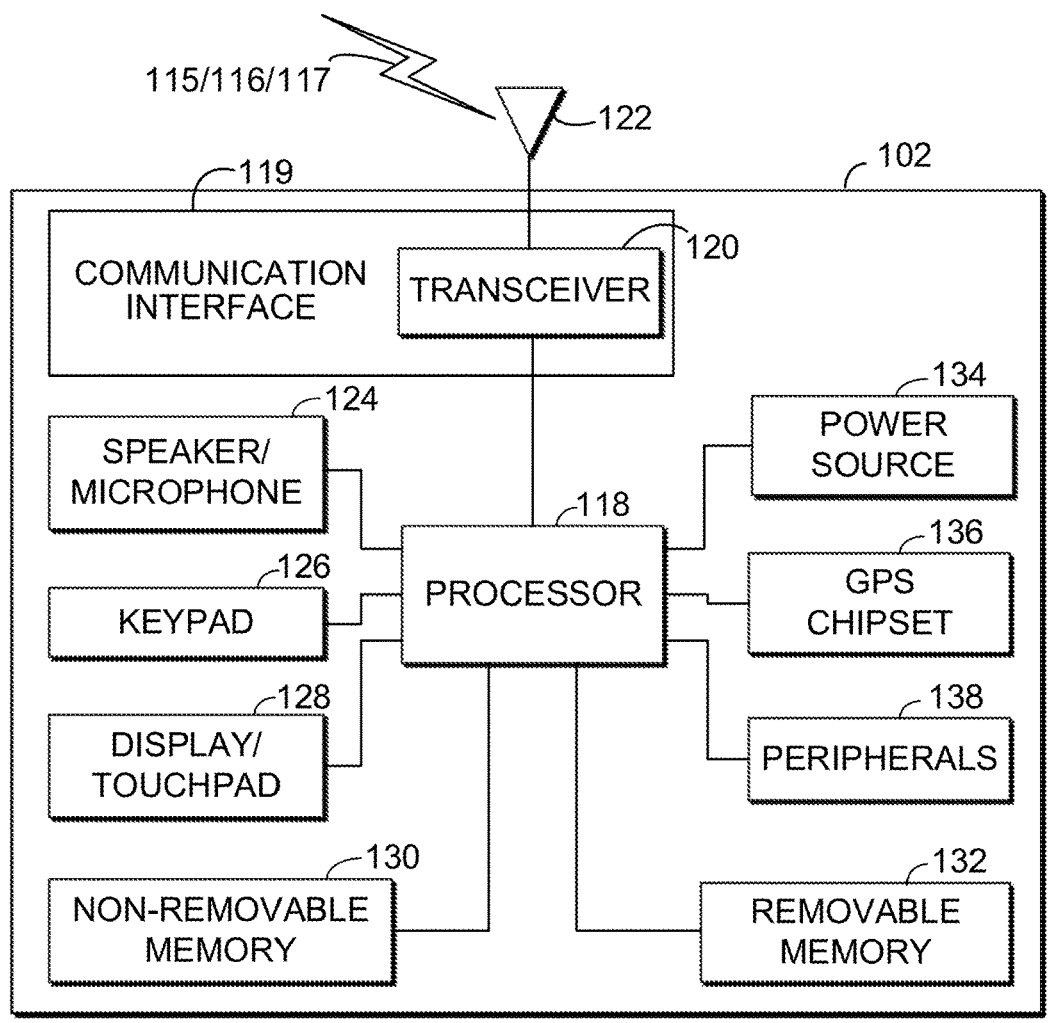
FIG. 15A depicts an example wireless transmit/receive unit (WTRU) that may be used within a communications system.

FIG. 15A is a system diagram of an example WTRU 102. As shown in FIG. 15A, the WTRU 102 may include a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. The transceiver 120 may be implemented as a component of decoder logic 119. For example, the transceiver 120 and decoder logic 119 may be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 102 may include any sub-combination of the foregoing elements while remaining consistent with an embodiment. Also, embodiments contemplate that base stations and/or the nodes that base stations may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 15A and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 15A depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 15A as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 15B:
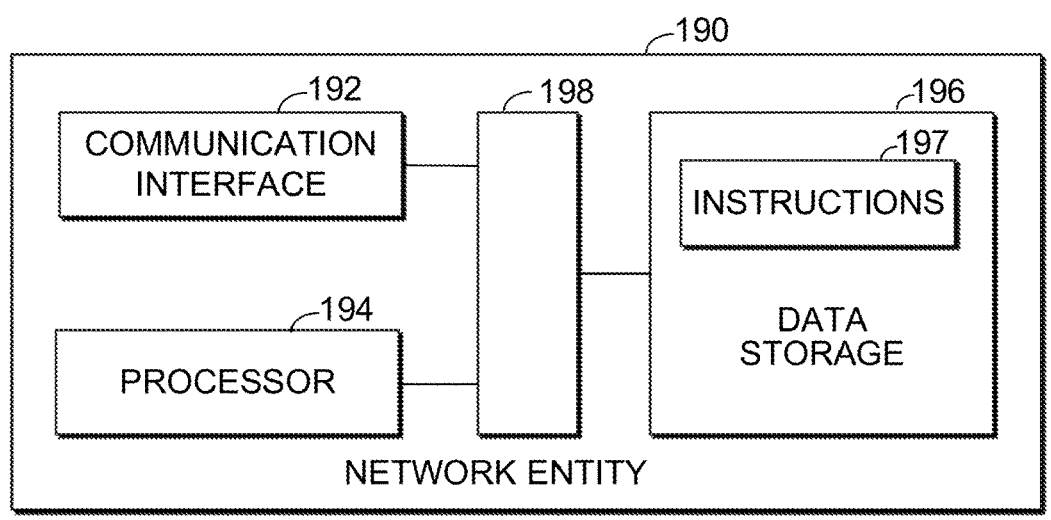
FIG. 15B depicts an exemplary network entity that may be used within a communication system.

FIG. 15B depicts an example network entity 190 that may be used within the communication system 100 of FIG. 15A. As depicted in FIG. 15B, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi-Fi communications, and the like). Thus, communication interface 192 may include the appropriate equipment and circuitry (which may include multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art may be used. As depicted in FIG. 15B, data storage 196 contains program instructions 197 executable by processor 194 for carrying out various combinations of the various network-entity functions described herein.

In some embodiments, the network-entity functions described herein are carried out by a network entity having a structure similar to that of network entity 190 of FIG. 15B. In some embodiments, one or more of such functions are carried out by a set of multiple network entities in combination, where each network entity has a structure similar to that of network entity 190 of FIG. 15B.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and those instructions may take the form of or include hardware (or hardwired) instructions, firmware instructions, software instructions, and/or the like, and may be stored in any suitable non-transitory computer-readable medium or media, such as commonly referred to as RAM or ROM.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
   determining a first state of motion of a user of an augmented reality (AR) display;
   identifying an object having associated AR information;
   in response to a determination that the first state of motion is not motion substantially towards the object, displaying the AR information on the AR display at a first location that at least partially obscures the object;
   after displaying the AR information at the first location, determining a second state of motion of the user; and
   in response to a determination that the second state of motion is motion substantially towards the object, moving the AR information to a second location at an offset from the object.

2. The method of claim 1,
   wherein the AR display is an AR headset, and
   wherein identifying the object is performed using a scene-sensing camera on the headset.

3. The method of claim 1, further comprising:
   rendering a subtle highlight on the object while the direction of travel is substantially towards the object; and
   rendering a prominent highlight on the object while the direction of travel is not substantially towards the object.

4. The method of claim 1, further comprising:
   identifying a second object having associated second AR information;
   determining whether the direction of travel is substantially towards the second object;
   selecting a location for display of the second AR information, wherein selecting the location comprises:
      selecting a third location at an offset from the second object while the direction of travel is substantially towards the object; and
      selecting a fourth location that at least partially obscures the second object while the direction of travel is not substantially towards the second object;
   displaying the second AR information at the selected location using the AR display;
   rendering a second soft glow overlay on the second object while the direction of travel is substantially towards the second object; and
   rendering a second strong highlight on the second object while the direction of travel is not substantially towards the second object.

5. The method of claim 1, further comprising:
   calculating one or more relevance scores for one or more correlating non-overlapping regions within visual field of view of the user;
   determining an activity zone as the region within visual field of view of the user with the highest relevance score for the user; and
   rendering on the display a line connecting the object with the first AR information with a soft glow overlay for the portion of the line inside the activity zone and a strong highlight for the portion of the line outside the activity zone.

6. The method of claim 5, further comprising:
   responsive to a determination that the object is inside the activity zone, rendering the line with a soft glow overlay; and responsive to a determination that the object is outside the activity zone, rendering the line with a strong highlight.

7. The method of claim 5, wherein the activity zone is a shape that is an outline of a person.

8. The method of claim 1, wherein the first state of motion is a state wherein the user is substantially stopped.

9. The method of claim 1, wherein the first state of motion is a state wherein the user is moving in a direction that is not substantially towards the object.

10. A method comprising:
determining a first state of motion of a user of an augmented reality (AR) display;
identifying an object having associated AR information;
in response to a determination that the first state of motion is motion substantially towards the object, displaying the AR information on the AR display at a first location at an offset from the object;
after displaying the AR information at the first location, determining a second state of motion of the user; and
in response to a determination that the second state of motion is not motion substantially towards the object, moving the AR information to a second location that at least partially obscures the object.

11. The method of claim 10, further comprising:
identifying an object having associated AR information;
determining whether the direction of travel is substantially towards the object;
rendering a soft glow overlay on the object while the direction of travel is substantially towards the object; and
rendering a strong highlight on the object while the direction of travel is not substantially towards the object.

12. The method of claim 10, wherein the second state of motion is a state wherein the user is substantially stopped.

13. The method of claim 10, wherein the second state of motion is a state wherein the user is moving in a direction that is not substantially towards the object.

14. A system comprising a processor configured to perform at least:
determining a first state of motion of a user of an augmented reality (AR) display;
identifying an object having associated AR information;
in response to a determination that the first state of motion is not motion substantially towards the object, displaying the AR information on the AR display at a first location that at least partially obscures the object;
after displaying the AR information at the first location, determining a second state of motion of the user; and
in response to a determination that the second state of motion is motion substantially towards the object, moving the AR information to a second location at an offset from the object.

15. The system of claim 14, further configured to perform:
rendering a subtle highlight on the object while the direction of travel is substantially towards the object; and
rendering a prominent highlight on the object while the direction of travel is not substantially towards the object.

16. The system of claim 14, further configured to perform:
identifying a second object having associated second AR information;
determining whether the direction of travel is substantially towards the second object;
selecting a location for display of the second AR information, wherein selecting the location comprises:
selecting a third location at an offset from the second object while the direction of travel is substantially towards the object; and
selecting a fourth location that at least partially obscures the second object while the direction of travel is not substantially towards the second object;
displaying the second AR information at the selected location using the AR display;
rendering a second soft glow overlay on the second object while the direction of travel is substantially towards the second object; and
rendering a second strong highlight on the second object while the direction of travel is not substantially towards the second object.

17. The system of claim 14, further configured to perform:
calculating one or more relevance scores for one or more correlating non-overlapping regions within visual field of view of the user;
determining an activity zone as the region within visual field of view of the user with the highest relevance score for the user; and
rendering on the display a line connecting the object with the first AR information with a soft glow overlay for the portion of the line inside the activity zone and a strong highlight for the portion of the line outside the activity zone.

18. The system of claim 17, further configured to perform:
responsive to a determination that the object is inside the activity zone, rendering the line with a soft glow overlay; and
responsive to a determination that the object is outside the activity zone, rendering the line with a strong highlight.

19. The system of claim 14, wherein the first state of motion is a state wherein the user is substantially stopped.

20. The system of claim 14, wherein the first state of motion is a state wherein the user is moving in a direction that is not substantially towards the object.

* * * * *